(12) United States Patent
Tsai et al.

(10) Patent No.: US 7,823,099 B2
(45) Date of Patent: Oct. 26, 2010

(54) LITHOGRAPHY SUSPECT SPOT LOCATION AND SCORING SYSTEM

(75) Inventors: Min-Chun Tsai, San Jose, CA (US); Charles C. Chiang, San Jose, CA (US)

(73) Assignee: SYNOPSYS, Inc., Mountain View, CA (US)

( * ) Notice: Subject to any disclaimer, the term of this patent is extended or adjusted under 35 U.S.C. 154(b) by 434 days.

(21) Appl. No.: 11/756,596

(22) Filed: May 31, 2007

(65) Prior Publication Data

US 2008/0301623 A1    Dec. 4, 2008

(51) Int. Cl.
*G06F 17/50*   (2006.01)
(52) U.S. Cl. .................... 716/4; 716/5; 716/21
(58) Field of Classification Search ............ 716/4, 716/5, 19–21; 430/5, 30
See application file for complete search history.

(56) References Cited

U.S. PATENT DOCUMENTS

| | | | | |
|---|---|---|---|---|
| 7,448,012 | B1 * | 11/2008 | Qian | 716/11 |
| 2005/0132322 | A1 * | 6/2005 | Inoue | 716/19 |
| 2007/0044049 | A1 * | 2/2007 | Adams et al. | 716/4 |
| 2007/0266362 | A1 * | 11/2007 | Lai et al. | 716/19 |
| 2008/0295046 | A1 * | 11/2008 | Su et al. | 716/4 |

* cited by examiner

*Primary Examiner*—Vuthe Siek
(74) *Attorney, Agent, or Firm*—Silicon Valley Patent Group, LLP; Edward S. Mao (57) ABSTRACT

A fast method to detect hot spots using foundry independent models that do not require RET/OPC synthesis is presented. In some embodiments of the present invention, sensitive spots are located. Lithography models are used to simulate the geometry near the sensitive spots to produce a model of the area around the sensitive spots. The sensitive spots are scored using a measure such as intensity (of light) or scoring based on contrast.

33 Claims, 8 Drawing Sheets

LITHOGRAPHY SUSPECT SPOT LOCATION AND SCORING SYSTEM

BACKGROUND

1. Field of the Invention

The invention relates to design of semiconductor chips. More specifically, the invention relates to a method and an apparatus for improving lithography printability for integrated circuits.

2. Related Art

Lithography, which allows selective removal portions of a thin film such as photoresist, is a key process used in the fabrication of integrated circuits. Specifically, a photomask with the desired geometric pattern is created. Then, a light source passes through the photomask to transfer the geometric pattern on the thin film, which covers a substrate. The portions of the thin film that received light through the photomask are chemically altered by the light so that later process steps can remove these portions of the thin film to expose selected portions of the substrate. The substrate is then further processed to create the features of the integrated circuit.

Figure 1A:
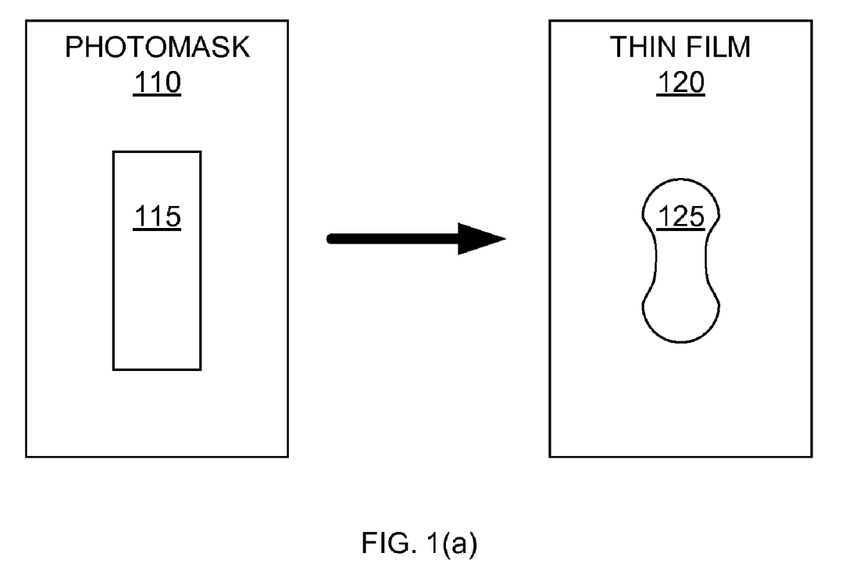
FIGS. 1(a)-1(b) are a simplified diagrams of lithography used in IC manufacturing.

When the feature size of the integrated circuit were relatively large, lithography techniques could easily transfer the geometric pattern of the photomask to the thin film. However, due to advancement in other areas of semiconductor processing, optical constraints in lithography processes has become a limiting factor of the feature size of semiconductor devices. Advancement in lithography allows feature sizes to be smaller than the wavelength of light used in the lithography pattern. However, the geometric pattern of the photomask does not transfer cleanly to the thin film. For example, as illustrated in FIG. 1(a), a rectangle 115 in a photomask 110 may result in a peanut shape 125 on thin film 120. In general, lithography steppers are limited to a critical dimension CD that is equal to a process factor (K1) multiplied by the frequency of the light used by the stepper ($\lambda$) divided by the numerical aperture (NA) (as show in Equation EQ1).

$$CD=(K1*\lambda)/NA \quad (EQ1)$$

Figure 1B:
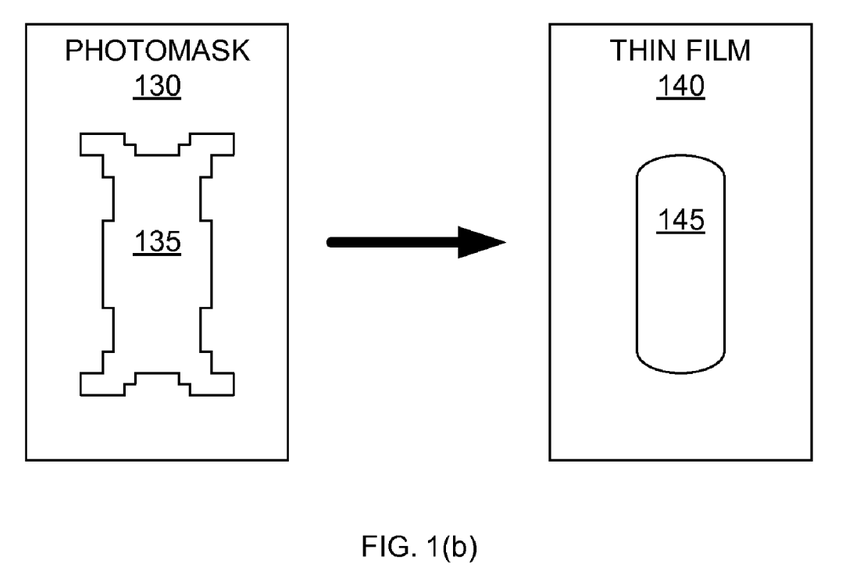

Lithography technology in 2007 uses deep ultraviolet light, which has a wavelength of 193 nm. The numerical aperture NA has a upper limit of 0.85 which can be increased using immersion technology to about 1.3-1.4. Because, the light frequency and numerical aperture are physically limited lithography processes attempt to reduce critical dimensions by reducing process factor k1 using various resolution enhancement techniques (RET) to improve the geometric pattern on the thin film. For example, in optical proximity correction(OPC), portions of the geometric pattern is reshaped to compensate for the deformity from the lithography process. As illustrated in FIG. 1(b), a reshaped polygon 135 (based on rectangle 115 of FIG. 1(a) with enhanced corners and sides) in a photomask 130 results in a near rectangular shape 145 on thin film 140. Near rectangular shape 145 approximates rectangle 115 more closely than peanut shape 125. Thus, RET/OPC can be used to improve the quality of the geometric pattern produced on the thin film and thus provides a better process factor K1.

However, RET/OPC require very complicated design rules. In addition, design rule technology in general can not adequately describe the complicated constraints of RET/OPC. Thus, even if a design passes the design rules, the integrated circuit manufactured from the design may still have "hot spots", i.e. areas which would cause failure of the integrated circuit. Thus, excessive design rules are created for use with RET/OPC techniques to minimize the chances of hot spots in the fabricated devices. The excessive design rules are likely to lead to false violations, which would greatly increase the design time required for integrated circuits to address all the false violations.

Alternatively, hot spot detection and correction may be delayed until after RET/OPC. However, the post RET/OPC hot spot detection and correction would require detailed information about the RET/OPC process that is used by each foundry. Furthermore, each new generation of RET/OPC techniques may require years of development. Thus, IC development and design typically occurs long before the RET/OPC techniques are certified. In addition, simulation required to perform the post RET/OPC hot spot detection and correction is extremely time consuming and can greatly delay the IC design. Hence there is a need for a method and apparatus for rapidly detecting potential hot spots (sensitive spots) in an IC design.

SUMMARY

Accordingly, the present invention provides a fast method to detect sensitive spots using foundry independent models that do not require RET/OPC synthesis. For example, in some embodiments of the present invention, a plurality of sensitive spots are located. Lithography models are used to simulate the geometry near the sensitive spots to produce a model of the area around the sensitive spots. The sensitive spots are scored using a measure such as intensity (of light) or contrast.

Some embodiments of the present invention locate bridging sensitive spots others locate pinching sensitive spots and others locate both bridging and pinching sensitive spots.

Specifically, in some embodiment of the present invention the lithography model is a foundry independent model that uses critical dimension that is smaller than the actual critical dimension of the fabrication process that will be used. By using a smaller critical dimension, the lithography models of the present invention do not require resolution enhancement techniques or optical proximity correction.

The present invention will be more fully understood in view of the following description and drawings.

DETAILED DESCRIPTION

Figure 2:
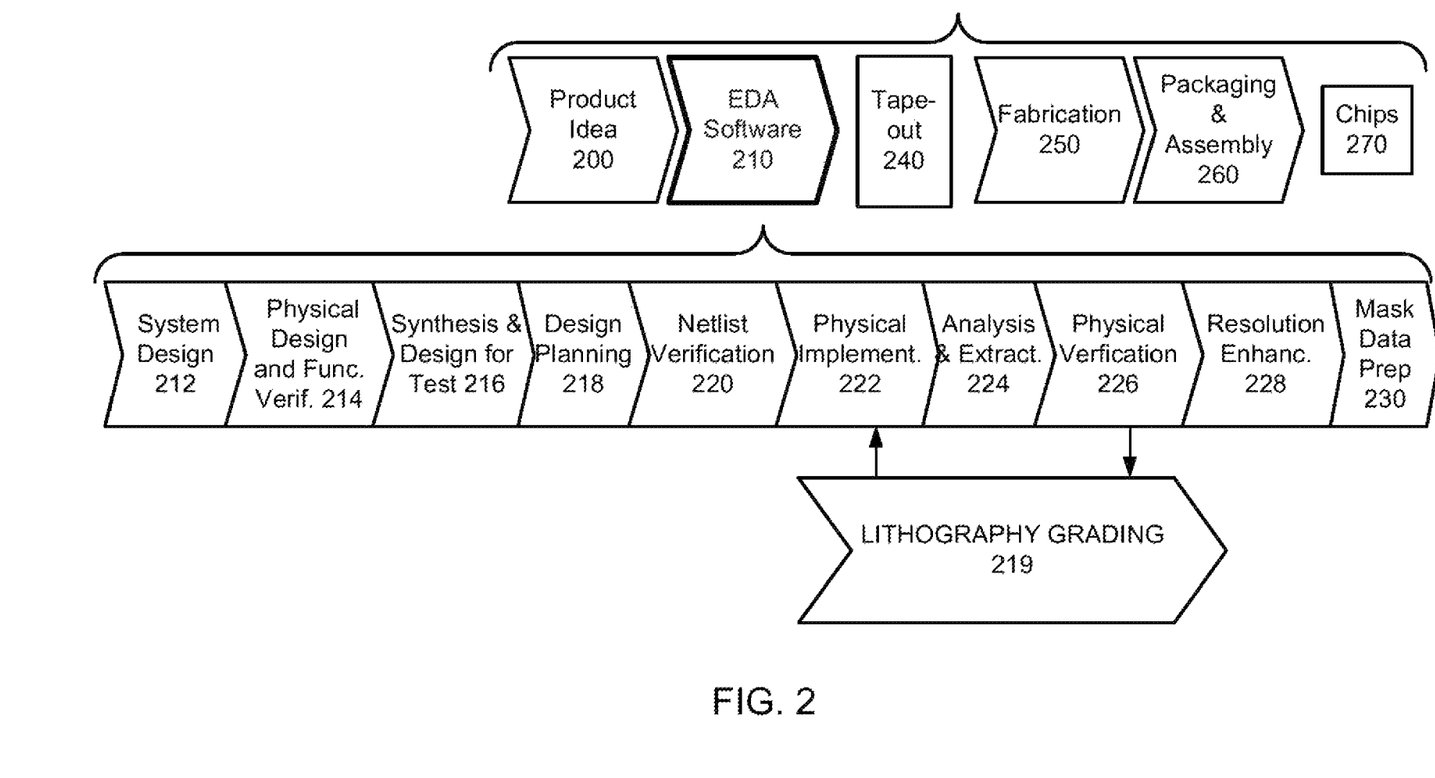
FIG. 2 is a simplified representation of an exemplary digital IC design flow in accordance with one embodiment of the present invention.

It may be helpful to place the processes of this invention in context of the overall chip design. FIG. 2 shows a simplified representation of an exemplary digital IC design flow. At a high level, the process starts with the product idea (200) and is realized in a EDA software design process (210). When the design is finalized, it can be taped-out (event 240). After tape out, the fabrication process (250) and packaging and assembly processes (260) occur resulting, ultimately, in finished chips (result 270).

The EDA software design process (210) is actually composed of a number of stages 212-230, shown in linear fashion for simplicity. In an actual IC design process, the particular design might have to go back through steps until certain tests are passed. Similarly, in any actual design process, these steps may occur in different orders and combinations. This description is therefore provided by way of context and general explanation rather than as a specific, or recommended, design flow for a particular IC. A brief description of the components of the EDA software design process (stage 210) will now be provided.

System design (stage 212): The circuit designers describe the functionality that they want to implement, they can perform what-if planning to refine functionality, check costs, etc. Hardware-software architecture partitioning can occur at this stage. Exemplary EDA software products from Synopsys, Inc. that can be used at this stage include Model Architect, Saber, System Studio, and DesignWare® products.

Logic design and functional verification (stage 214): At this stage, the VHDL or Verilog code for modules in the system is written and the design (which may be of mixed clock domains) is checked for functional accuracy. More specifically, the design is checked to ensure the design produces the correct outputs. Exemplary EDA software products from Synopsys, Inc. that can be used at this stage include VCS, VERA, DesignWare®, Magellan, Formality, ESP and LEDA products.

Synthesis and design for test (stage 216): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this stage include Design Compiler®, Physical Compiler, Test Compiler, Power Compiler, FPGA Compiler, Tetramax, and DesignWare® products.

Design planning (stage 218): Here, an overall floorplan for the chip is constructed and analyzed for timing and top-level routing. Exemplary EDA software products from Synopsys, Inc. that can be used at this stage include Jupiter and Floorplan Compiler products. Although circuitry and portions thereof (such as standard cells) are described herein as if they exist in the real world, it is to be understood that at this stage only a computer model exists in a programmed computer. The actual circuitry in the real world is created after this stage.

Netlist verification (stage 220): At this step, the netlist is checked for compliance with timing constraints and for correspondence with the VHDL/Verilog source code. Exemplary EDA software products from Synopsys, Inc. that can be used at this stage include VCS, VERA, Formality and PrimeTime products.

Physical implementation (stage 222): The placement (positioning of circuit elements) and routing (connection of the same) occurs at this step. Exemplary EDA software products from Synopsys, Inc. that can be used at this stage include the Astro product.

Analysis and extraction (stage 224): At this step, the circuit function is verified at a transistor level, this in turn permits what-if refinement. Exemplary EDA software products from Synopsys, Inc. that can be used at this include Star RC/XT, Raphael, and Aurora products.

Physical verification (stage 226): At this stage various checking functions are performed to ensure correctness for: manufacturing, electrical issues, lithographic issues, and circuitry. Exemplary EDA software products from Synopsys, Inc. that can be used at this include the Hercules product. In accordance with the present invention, Lithography grading 219 as described in detail below, occurs during physical verification 226 and may require a return to physical implementation 222 to correct potential hot spots. Conventional systems may perform hot spot detection after resolution enhancement 228 (as explained above) or would require design rules tailored to the RET/OPC process for the specific foundry performing fabrication 250.

Resolution enhancement (stage 228): This stage involves geometric manipulations of the layout to improve manufacturability of the design. Exemplary EDA software products from Synopsys, Inc. that can be used at this include iN-Phase, Proteus, and AFGen products.

Mask data preparation (stage 230): This stage provides the "tape-out" data for production of masks for lithographic use to produce finished chips. Exemplary EDA software products from Synopsys, Inc. that can be used at this stage include the CATS(R) family of products.

Figure 3:
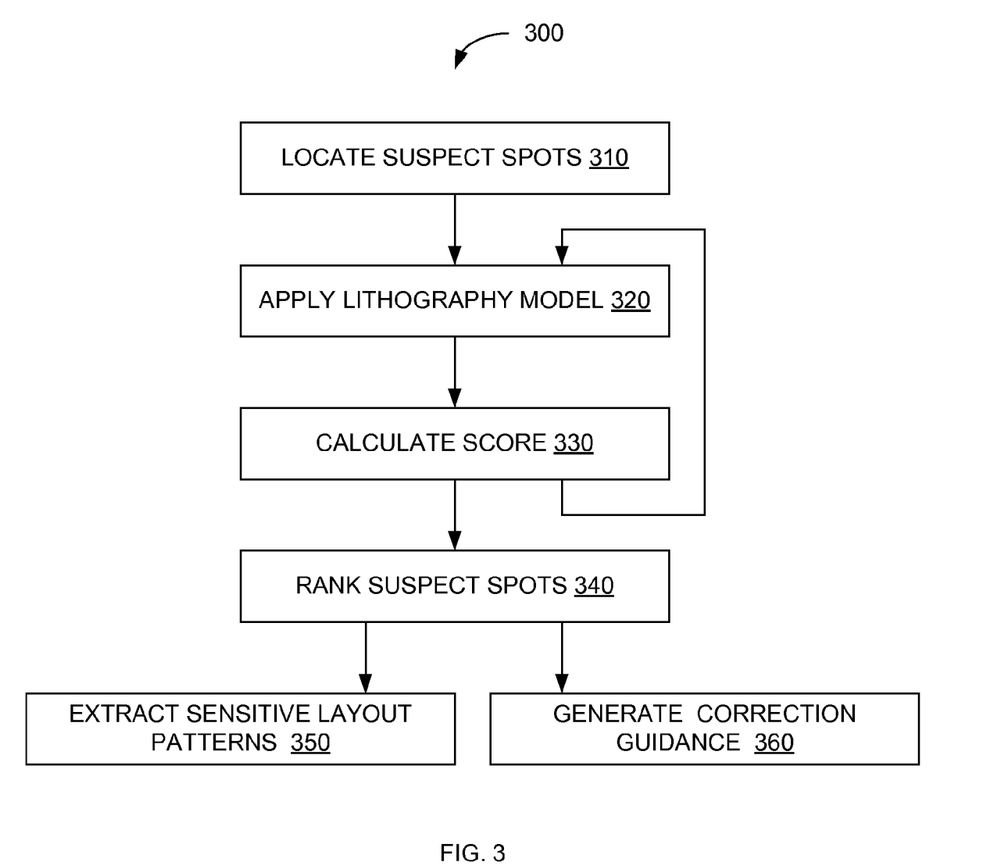
FIG. 3 is a flow chart of one embodiment of the present invention.

FIG. 3 is a flow chart 300 illustrating an embodiment of the present invention for lithography printability grading in accordance with one embodiment of the present invention. First sensitive spots are located in LOCATE SENSITIVE SPOTS 310. Sensitive spots are areas of the design layout that are more likely to be actual hot spots after fabrication. Sensitive spot location is performed using user defined parameters for various types of potential problems such as bridging (short circuits) and pinching (open circuits). A primary benefit of the present invention is that the sensitive spots are detected automatically after the parameters are defined. Generally, sensitive spots for the same type of potential problem are processed together. Sensitive spot location in accordance with some embodiments of the present invention are described below. Each sensitive spot is individually analyzed and scored in APPLY LITHOGRAPHY MODEL 320 and CALCULATE SCORE 330. Specifically, a user defined area around each sensitive spot is simulated using lithography models for the geometries. In general a large area is simulated to better include other features that may cause problems near the sensitive spot. For example, in one embodiment of the present invention for a process using a wave length of 193 nm, a 1 micron radius area is used for the simulation. In another embodiment using a wavelength of 157 nm a 0.5 micron radius area is used for simulation. Foundry independent lithography models are used unless foundry specific models are available. The simulation of the area around the sensitive spot is analyzed and given a score that indicates the likelihood of the sensitive spot resulting in an actual hot spot during fabrication. Various novel scoring methods in accordance with embodiments of the present invention are described below.

In accordance with one embodiment of the present invention, the foundry independent lithography models are "next generation" lithography models without resolution enhancement techniques. Specifically, the foundry independent lithography models use values of light wavelength $\lambda$ and numerical aperture NA that result in a smaller critical dimension CD than for the actual lithography process that is slated to be used in the fabrication of the design. Generally, the foundry independent lithography models use a smaller light wavelength $\lambda$, a higher numerical aperture NA, or a combination of smaller light wavelength $\lambda$ and higher numerical aperture NA. For example, some embodiments of the present invention use light wavelength values of 157 nm or 120 nm instead of the 193 nm of the actual lithography process slated for fabrication. However, some embodiments of the present invention may use a much smaller light wavelength or with a much larger numerical aperture and still obtain a smaller critical dimension CD. (see equation EQ1). By using a "next generation" foundry independent lithography model, that does not include resolution enhancement techniques, the present invention approximates the results obtained with current lithography processes enhanced with resolution enhancement techniques. Because resolution enhancement techniques are not used in the foundry independent lithography model, the problems described above (i.e., excessive and often incomplete design rules and long simulation times) are greatly reduced.

In some embodiments of the present invention a novel light intensity tracing process is used in CALCULATE SCORE 330 for each sensitive spot. However, other embodiments of the present invention may use conventional methods to score the sensitive spots. After the sensitive spots are scored the sensitive spots are sorted and ranked based on the score in RANK SENSITIVE SPOTS 340. Generally, only sensitive spots for the same potential problems are grouped together for sorting and ranking. Thus, in one embodiment of the present invention separate rankings are made for bridging sensitive spots and pinching sensitive spots.

After ranking, sensitive layout patterns around sensitive spots (i.e. sensitive spots with scores indicating a likelihood of failure) are extracted in EXTRACT SENSITIVE LAYOUT PATTERNS 350. The factors determining whether a sensitive spot is a sensitive spot can be user defined and are generally based on the fabrication process and the scoring method. The sensitive layout patterns can be modified to avoid potential manufacturing problems.

Alternatively, the ranking of sensitive spots can be used to generate correction guidance GENERATE CORRECTION GUIDANCE 360. Guidance correction in general involves increasing the spacing between patterns for sensitive spots that may result in short circuits or increasing pattern size for sensitive spots that may result in open circuits. For example in a particular embodiment of the present invention, sizing changes are advised to be two grid points (For 65 nanometer process and 90 nanometer process grid points are usually 5 nanometers apart.) As used herein grid points are the manufacturing grid points used by the targeted process.

Figure 4:
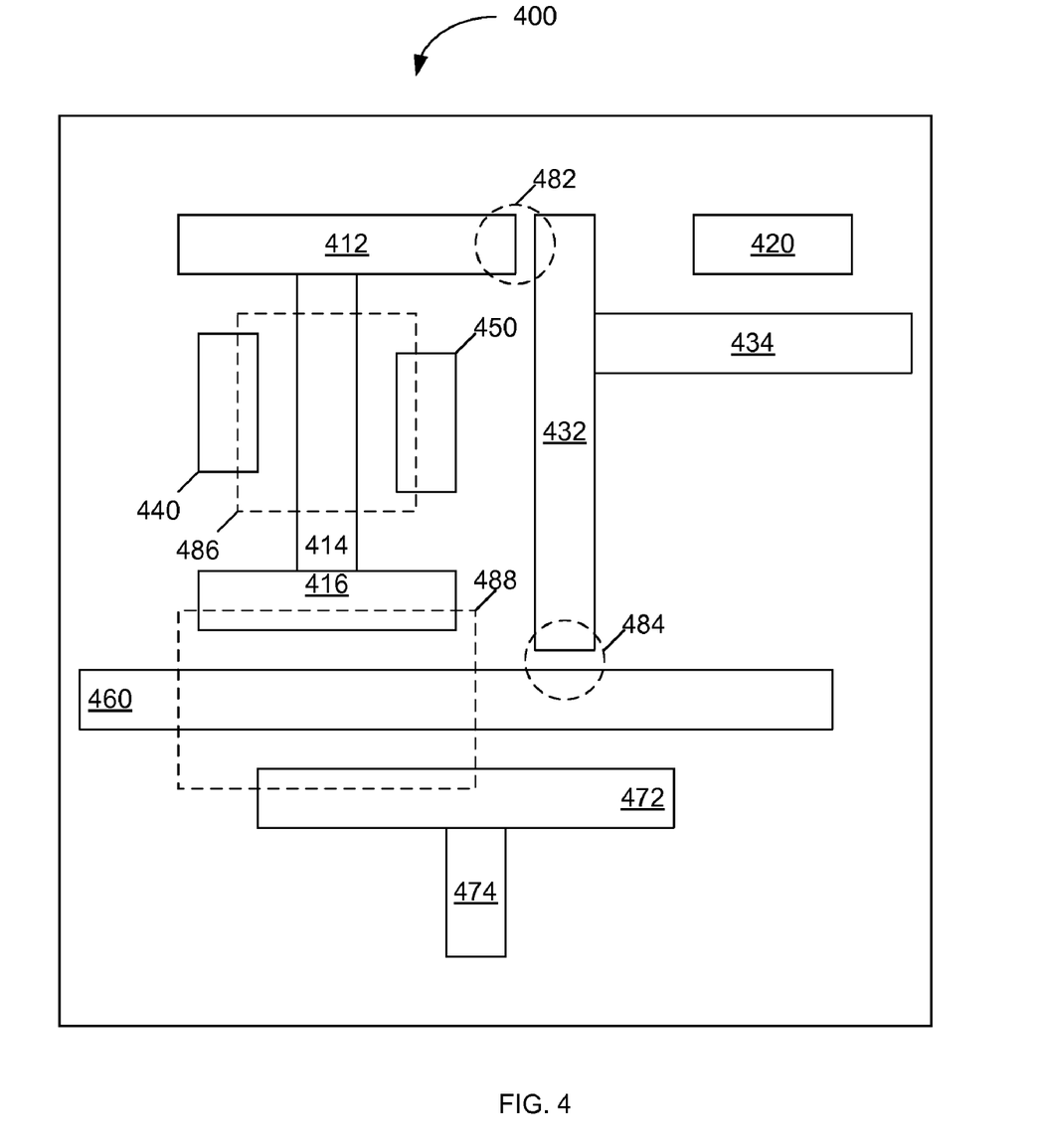
FIG. 4 illustrates a simplified design layout with sensitive spots in accordance with one embodiment of the present invention.

FIG. 4 illustrates potential sensitive spots for a simplified design layout 400 which is simulated using the "next generation" lithography models described above. Complicated features are divided into smaller rectangular features. For example, rectangular features 412, 414, and 416 are portions of an "I" shaped feature. Similarly, rectangular features 432 and 434 are part of a "T" shaped feature (rotated 90 degrees) and rectangular features 473 and 474 are portions of another "T" shaped feature. Design layout 400 also includes rectangular features 420, 440, 450, and 460. Rectangular features are used in the examples herein for clarity. However, the principles of the present invention are also applicable to more complicated shapes. In general the features of concern for sensitive spot (and hot spots) are conductors such as metals, heavily doped silicon, silicides, and salicides.

Sensitive spot location is performed using user defined parameters for various types of potential problems such as bridging (short circuits) and pinching (open circuits) problems. Bridging may occur if features in the design are too close together. For example in FIG. 4, a bridging sensitive spot 482 is located where rectangular features 412 and 432 are very close together and a second bridging sensitive spot 484 is located where rectangular features 432 and 460 are close together. In one embodiment of the present invention, a user defined bridging distance parameter defines the minimum distance between features that creates a bridging sensitive spot. Various geometric searching algorithms can be used to find features that separated by less than bridging distance parameter. For example, various EDA packages, such as ICC, Hercules or Calibre include searching algorithms that can be used to locate bridging sensitive spots.

To improve search speeds some embodiments of the present invention use a bridging search area around a current feature. For example, in a specific embodiment of the present invention, the bridging search area for the current feature is defined by a user defined bridging search distance from the perimeter of the feature. All other features within the bridging search area are compared with the current feature and sensitive spots are located wherever a feature is closer than the bridging distance parameter to the current feature. In a specific embodiment of the present invention for a fabrication process having minimum distance (separation distance) of 100 nm (for 65 nm technology Metal 2), the bridging search distance and bridging distance parameter is 120 nm. Other embodiments may use a smaller bridging distance parameter. In some embodiments of the present invention bridging search distance and bridging distance parameter are defined with grid points. Furthermore most embodiments of the present invention have default values for the user defined parameters. For example in a particular embodiment of the present invention the default bridging search distance is the minimum distance plus 4 grid points and the bridging distance parameter is the minimum distance plus 2 grid points.

Pinching may occur when a first feature is sandwiched between a second feature and a third feature. For example in FIG. 4, a pinching sensitive spot 486 is located where the portion of rectangular feature 414 is sandwiched between rectangular features 440 and 450. A second pinching sensitive spot 488 is located where the portion of rectangular feature 460 is sandwiched between rectangular feature 416 and 472. In one embodiment of the present invention, a user defined pinching distance parameter and a user defined pinching length parameters are used in the location of pinching sensitive spots. Specifically, the pinching distance parameter defines the minimum distance between the features of the "sandwich" to be considered a sensitive spot. The pinching length parameter defines the minimum length of the sandwich to be considered a sensitive spot. Conventional techniques, such as available in various EDA packages, such as ICC, Hercules or Calibre can be used to locate pinching sensitive spots. To reduce the search time, some embodiments of the presenting invention define a pinching search area for each feature. In one embodiment of the present invention the pinching search area for a current feature is defined by a pinching search distance extending from the perimeter of the current feature. All other features within the pinching search area are compared with the current feature and sensitive spots are located wherever a sandwich pattern having a first feature that is closer than the pinching distance parameter on one side of the current feature, a second feature that is closer than the pinching distance parameter on the opposite side of the current feature, and an overlap length that is greater than the pinching length parameter. In a specific embodiment of the present invention for a fabrication process having a critical dimension of 100 nm, the pinching search distance is 120 nm, the pinching distance parameter is also 120 nm, and the pinching length parameter is 100 nm. In some embodiments of the present invention pinching search distance and pinching distance parameter are defined with grid points. Furthermore most embodiments of the present invention have default values for the user defined parameters. For example in a particular embodiment of the present invention the default pinching search distance is the critical distance plus 4 grid points, the pinching distance parameter is the critical distance plus 2 grid points, the pinching length parameter is 100 nm.

As explained above, a large area around each sensitive spot is simulated using the lithography models. Generally the area simulated would include other rectangular features. For example the simulation area for sensitive spot 484 would likely include portions of rectangular features 416 and 472 and may even include portions of rectangular feature 450 and 474. Similarly, the simulation area for sensitive spot 488 would likely include portions rectangular features 414, 440, 450, 432, and 474. Scoring is then performed on the simulated area.

Figure 5A:
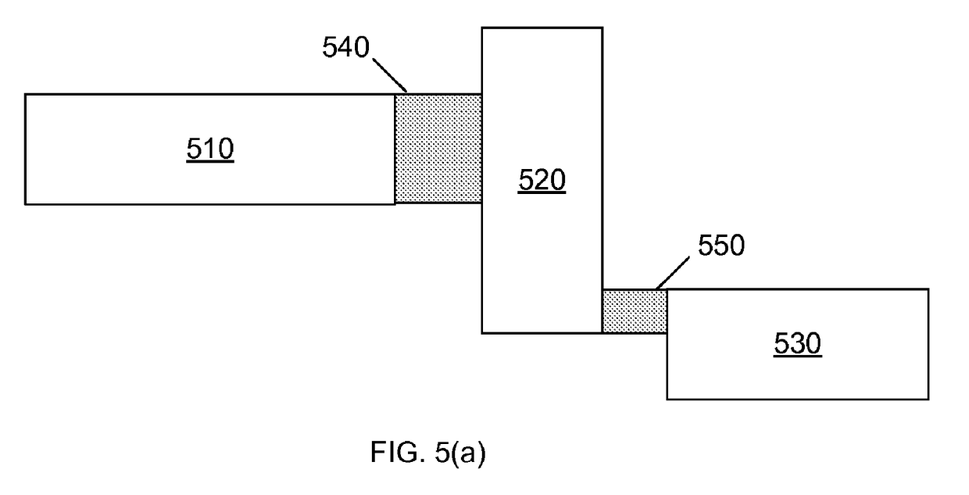
FIGS. 5(a)-5(c) illustrate scoring of bridging sensitive spots in accordance with some embodiments of the present invention.
Figure 5B:
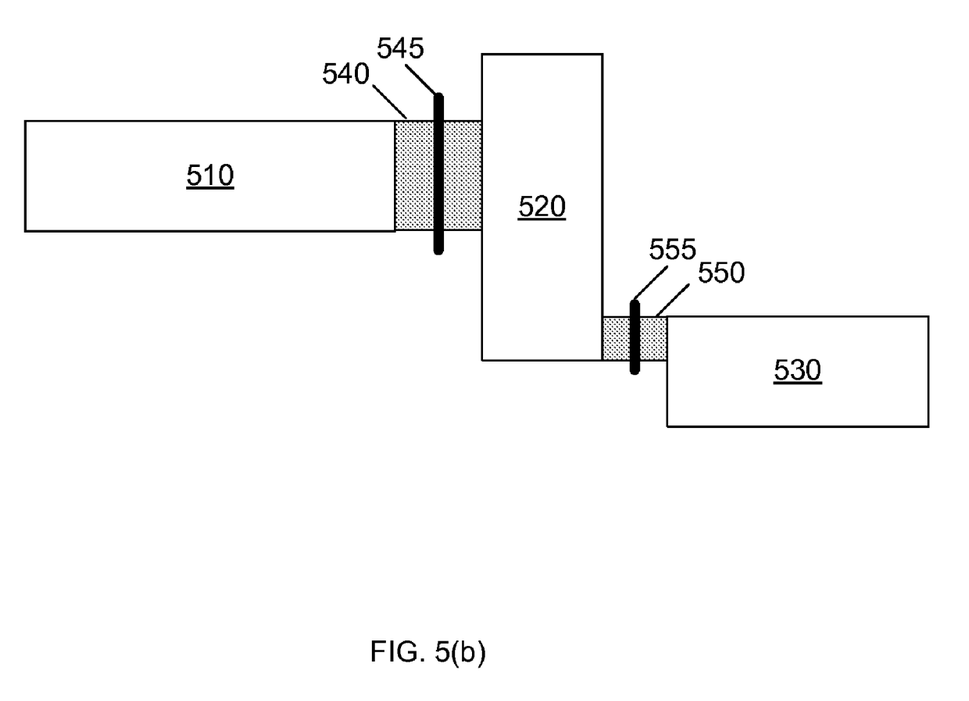

FIGS. 5(*a*)-5(*b*) illustrate scoring of bridging sensitive spots. Specifically, in FIG. 5(*a*) a rectangular feature 510 is close to a second rectangular feature 520, which is also close to a third rectangular feature 530. The key area of a first bridging sensitive spot is illustrated as a shaded area 540 and the key area of a second bridging sensitive spot is illustrated as a shaded area 550. The key area is limited by the portions of the features that actually overlap. Thus, for example in FIG. 5(*a*) key area 540 of the first bridging sensitive spot is limited by the upper and lower edges of rectangular feature 510 and key area 550 of the second bridging sensitive spot is limited by the top edge of rectangular feature 530 and the bottom edge of rectangular area 520.

Then as illustrated in FIG. 5(*b*), bridging scoring lines are defined through the middle of the key areas between the two features. The bridging scoring lines extend slightly beyond the border of the key area. The amount of extension can be a user defined parameter. Specifically, in FIG. 5(*b*) a bridging scoring line 545 is defined through the middle key area 540 with endpoints outside the borders of key area 545. Similarly a bridging scoring line 555 is defined through the middle of key area 550 with endpoints outside of key area 550. Scoring of the bridging sensitive spot is performed along the corresponding bridging scoring line.

In one embodiment of the present invention, scoring is based on light intensity along the bridging scoring line. Light intensity can be obtained using an aerial image simulator, which is included in many EDA software packages. Specifically, conducting regions (e.g. the rectangular features) are "light" regions while the non conducting regions are "dark" regions. For bridging sensitive spots higher light intensity indicates a greater chance of the bridging sensitive spot being shorted and thus a greater chance of the bridging sensitive spot being an actual hot spot during manufacturing. Thus the score for a key area is the highest light intensity on the scoring line. Generally, the score is normalized and any score above a user defined bridging threshold is considered a highly sensitive spot that should be redesigned. The user defined bridging threshold is generally in the range 0.15 to 0.3 for a 65 nm process using a 193 nm wavelength stepper using an alternating phase shift mask.

Figure 5C:
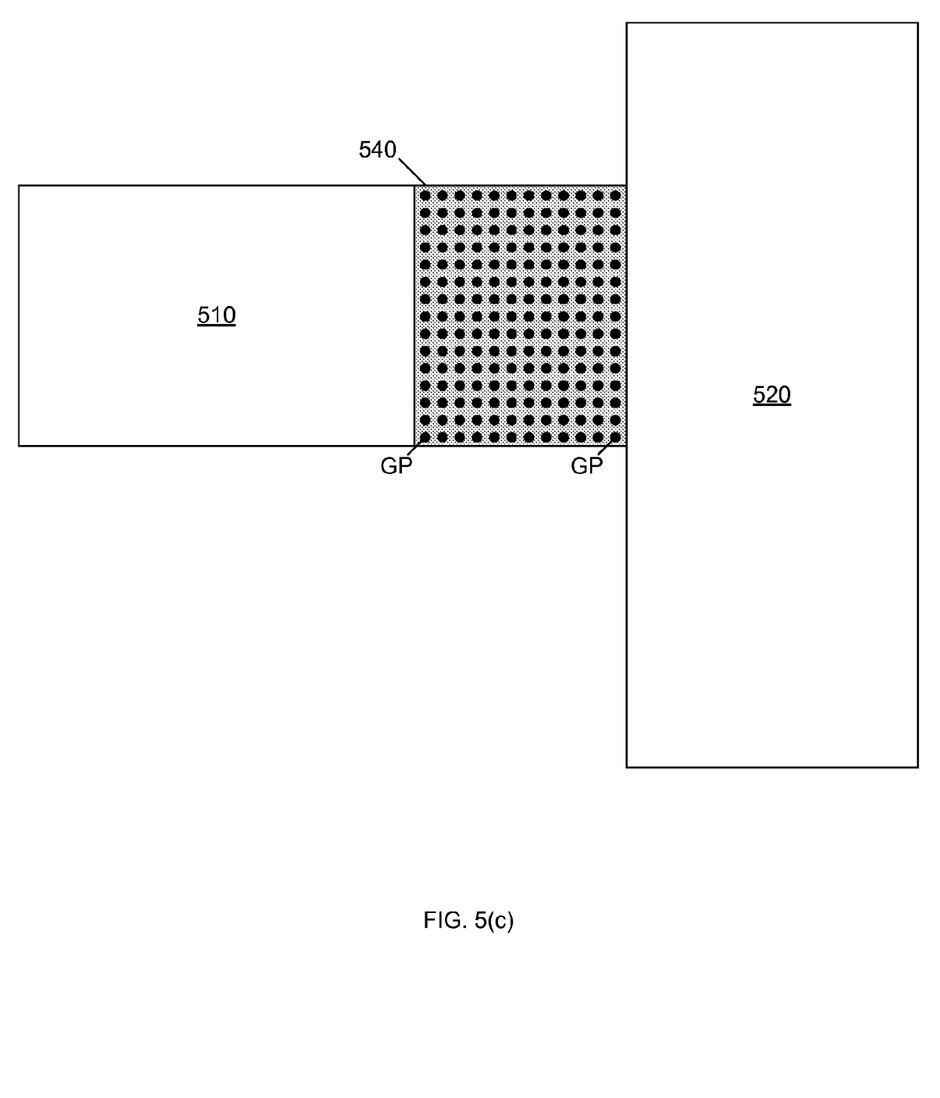

In another embodiment of the present invention, contrast comparisons are used for scoring. FIG. 5(*c*) is an enlarged view of key area 540, rectangular feature 520 and a portion of rectangular feature 510. As illustrated in FIG. 5(*c*), key area 540 encompasses a multitude of grid points GP. A bridging offset direction (vertical or horizontal) is defined for the key area. The offset direction is horizontal if the two features defining the key area are horizontally offset. For key area 540 the offset direction is horizontal. For the key area is sensitive spot 484 (FIG. 4) the offset direction would be vertical.

For each line of grid points in the offset direction (horizontal in key area 540) a line contrast score is computed. The line contrast score for a line of grid points is the difference between the maximum contrast at a grid point in the line and the minimum contrast at a grid point in the line divided by the sum of the maximum contrast at a grid point in the line and the minimum contrast at a grid point in the line. Equation EQ1 shows how to calculate the line contrast score LCS symbolically, where Cmax is the maximum contrast at a grid point in the line and Cmin is the minimum contrast at a grid point in the line.

$$LCS=(Cmax-Cmin)/(Cmax+Cmin) \qquad \text{EQ1}$$

The bridging score for the key area is equal to the highest line contrast score of any line in the key area. Using this scoring technique, the lower the score the greater the possibility of bridging.

Figure 6A:
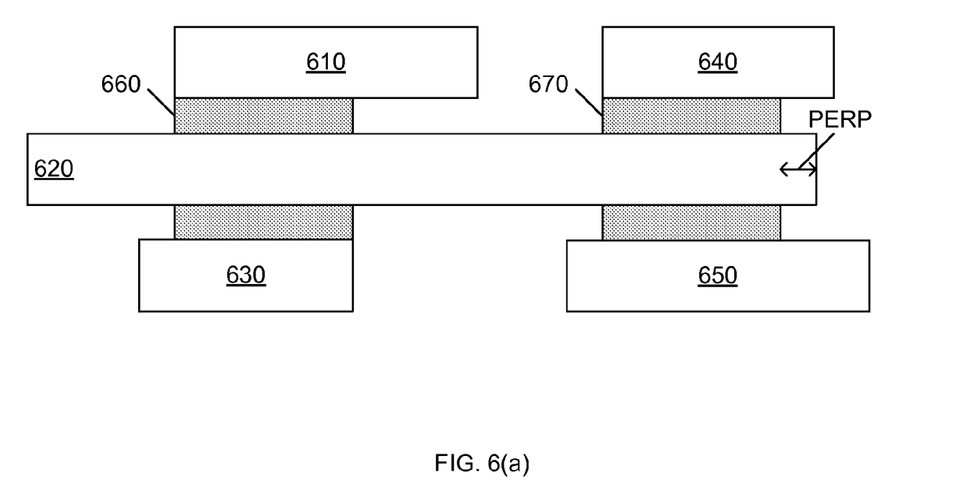
FIGS. 6(a)-6(c) illustrate scoring of pinching sensitive spots in accordance with some embodiments of the present invention.
Figure 6B:
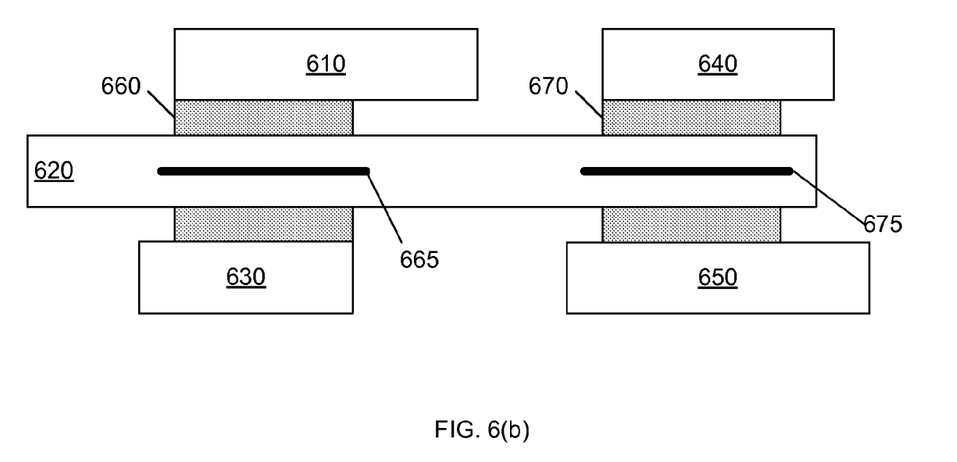

FIGS. 6(*a*)-6(*b*) illustrate scoring of pinching sensitive spots. Specifically, in FIG. 6(*a*) a rectangular feature 610 is sandwiched by rectangular features 610 and 630 and is also sandwiched by rectangular features 640 and 650. The key area of a first pinching sensitive spot is illustrated as a shaded area 670 and the key area of a second bridging sensitive spot is illustrated as a shaded area 670. The key area is limited by the portions of the features that actually overlap. Thus, for example in FIG. 6(*a*) key area 660 of the first pinching sensitive spot is limited by the left edge of rectangular feature 610 and the right edge of rectangular feature 630. Furthermore, for pinching sensitive spots, the ends of the center feature in the sandwich is not a major concern for open circuits; therefore, most embodiments of the present invention retract the edge of any key areas away from the ends of the center feature of a sandwich by a user defined pinching end retraction parameter (PERP in FIG. 6(*a*)). Thus, as illustrated in FIG. 6(*a*), key area 670 of the second pinching sensitive spot is limited by the left edge of rectangular feature 640 and the right edge of rectangular feature 620 retracted by the pinching end retraction parameter PERP.

Then as illustrated in FIG. 6(*b*), pinching scoring lines are defined through the middle of the center rectangular feature of the sandwich in parallel with the center rectangular feature. The scoring lines extend slightly beyond the border of the key area. The amount of extension can be a user defined parameter. Specifically, in FIG. 6(*b*) a pinching scoring line 665 is defined through the middle of rectangular feature 620 with endpoints outside the borders of key area 660. Similarly a pinching scoring line 575 is defined through the middle of rectangular feature 620 with endpoints outside of key area 670. Scoring of the pinching sensitive spot is performed along the corresponding pinching scoring line.

In one embodiment of the present invention, scoring is based on light intensity along the pinching scoring line. Specifically, conducting regions (e.g. the rectangular features) are "light" regions while the non conducting regions are "dark" regions. For pinching sensitive spots lower light intensity indicates a greater chance of the sensitive spot being shorted and thus a greater chance of the sensitive spot being an actual hot spot. To reverse this relationship many embodiments of the present invention normalize the intensity values and then use 1 minus the normalized intensity value as the score for pinching sensitive spots. Any score above a user defined pinching threshold is considered a highly sensitive spot that should be redesigned. The user defined pinching threshold is generally in the range 0.15 to 0.3.

Figure 6C:
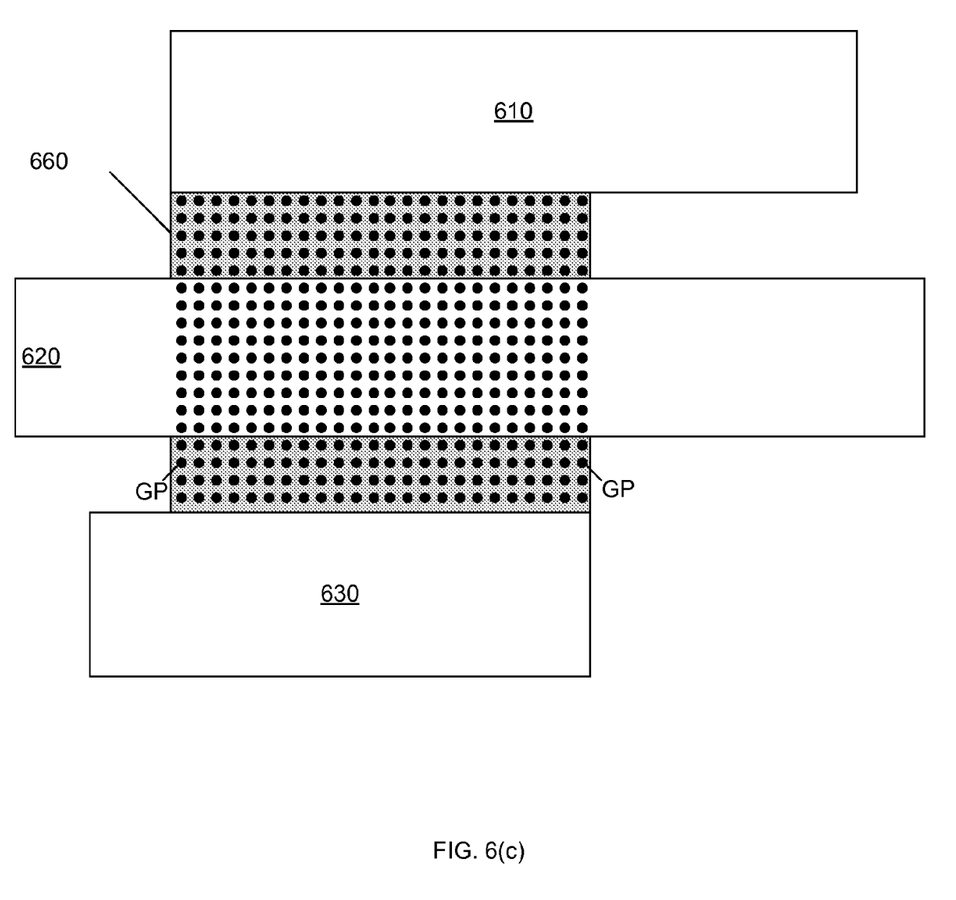

In another embodiment of the present invention, contrast comparisons are used for scoring. FIG. 6(*c*) is an enlarged view of key area 660, rectangular feature 610, rectangular feature 630 and a portion of rectangular feature 620. As illustrated in FIG. 6(*c*), key area 660 encompasses a multitude of grid points GP. An offset direction (vertical or horizontal)

is defined for the key area direction (vertical or horizontal) is defined for the key area. The bridging offset direction is orthogonal to the direction of the sandwich of features defining the key. Thus for key area 660 the pinching offset direction is vertical. For the key area is sensitive spot 486 (FIG. 4) the pinching offset direction would be horizontal. The offset direction is vertical if the three features defining the key area are vertically offset from each other.

For each line of grid points in the pinching offset direction (vertical in key area 660) a line contrast score is computed. The line contrast score for a line of grid points is the difference between the maximum contrast at a grid point in the line and the minimum contrast at a grid point in the line divided by the sum of the maximum contrast at a grid point in the line and the minimum contrast at a grid point in the line. Equation EQ1 given above shows how to calculate the line contrast score LCS symbolically, where Cmax is the maximum contrast at a grid point in the line and Cmin is the minimum contrast at a grid point in the line.

The pinching score for the key area is equal to the lowest line contrast score of any line in the key area. Using this scoring technique, the lower the score the greater the possibility of pinching.

After the sensitive spots of a particular category (e.g. the pinching sensitive spots and the bridging sensitive spots) are scored. The sensitive spots can be ranked to generate a chip health graph. The chip health graph gives a fast summary regarding the "health of the chip" with respect to bridging and pinching.

Thus lithography printability grading for sensitive spots in accordance with the present invention make use of "next generation" lithography models without resolution enhancement techniques to approximate the results of current generation lithography processes using resolution enhancement techniques. Thus the present invention avoids the complication and difficulties of simulating the resolution enhancement techniques.

Generally, the present invention is likely to be implemented on a computer as part of an EDA package. The computer programmed in accordance with the invention receives a design of an integrated circuit device. Then, with appropriate parameters from the user, the locations of the sensitive spots are located and evaluated as described above.

The data structures and software code for implementing one or more acts described in this detailed description can be stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet. In one embodiment, the carrier wave includes computer instruction signals for carrying out the process described above.

Numerous modifications and adaptations of the embodiments described herein will become apparent to the skilled artisan in view of this disclosure and are encompassed by the scope of the invention.

What is claimed is:

1. A method of identifying hot spots in an integrated circuit (IC) design for use with a fabrication process having a first critical dimension, the method comprising:
    locating a plurality of sensitive spots in the IC design; and
    simulating a plurality of areas around the sensitive spots using a plurality of lithography models having a second critical dimension by a computer processor, wherein the second critical dimension is smaller than the first critical dimension of the fabrication process.

2. The method of claim 1, wherein the locating a plurality of sensitive spots in the IC design comprises locating a plurality of bridging hot spots.

3. The method of claim 2, wherein the locating a plurality of bridging hot spots comprises: finding a first feature of the IC design within a bridging distance from a second feature IC design.

4. The method of claim 1, wherein the locating a plurality of sensitive spots in the IC design comprises locating a plurality of pinching hot spots.

5. The method of claim 4, wherein the locating a plurality of pinching hot spots comprises finding a first feature sandwiched between a second feature and a third feature, wherein the second feature and the third feature are within a pinching distance from the first feature.

6. The method of claim 1, wherein the lithography models use a smaller light wavelength than the fabrication process.

7. The method of claim 1, wherein the lithography models use a higher numerical aperture than the fabrication process.

8. The method of claim 1, wherein the fabrication process includes using resolution enhancement techniques and the simulating a plurality of areas around the sensitive spots does not include using resolution enhancement techniques.

9. The method of claim 1, wherein the fabrication process includes using optical proximity correction and the simulating a plurality of areas around the sensitive spots does not comprise using optical proximity correction.

10. The method of claim 1, further comprising defining a key area within a sensitive spot.

11. The method of claim 10, further comprising scoring the key area.

12. The method of claim 11, wherein the scoring the key area comprises:
    defining a scoring line within the key area; and
    measuring light intensity along the scoring line based on a aerial image simulation.

13. The method of claim 12, wherein a highest light intensity is used to calculate the score for the key area.

14. The method of claim 12, wherein the lowest light intensity is used to calculate the score for the key area.

15. The method of claim 11, wherein the scoring the key area comprises calculating a line contrast score for a plurality of lines in the key area.

16. The method of claim 11, wherein the scoring the key are comprises:
    defining an offset direction; and
    calculating a line contrast score for a plurality of lines of grid points within the key area; where the lines are in the offset direction.

17. The method of claim 16, wherein the lowest line contrast score is used to calculate the score for the key area.

18. The method of claim 1, wherein the lithography models are foundry independent.

19. The method of claim 1, wherein a size of the plurality of areas is user-definable.

20. A computer storage device encoded with instructions to perform the method of claim 1.

21. A computer system configured to identify hot spots in an integrated circuit (IC) design for use with a fabrication process having a first critical dimension by:
    locating a plurality of sensitive spots in the IC design; and simulating a plurality of areas around the sensitive spots using a plurality of lithography models having a second critical dimension, wherein the second critical dimension is smaller than the first critical dimension of the fabrication process.

22. A computer system for identifying hot spots in an integrated circuit (IC) design for use with a fabrication process having a first critical dimension, the computer system comprising:
   means for locating a plurality of sensitive spots in the IC design; and
   means for simulating a plurality of areas around the sensitive spots using a plurality of lithography models having a second critical dimension, wherein the second critical dimension is smaller than the first critical dimension of the fabrication process.

23. The computer system of claim 22, wherein the means for locating a plurality of sensitive spots in the IC design comprises means for locating a plurality of bridging hot spots.

24. The computer system of claim 22, wherein the means for locating a plurality of sensitive spots in the IC design comprises means for locating a plurality of pinching hot spots.

25. The computer system of claim 22, wherein the lithography models use a smaller light wavelength than the fabrication process.

26. The computer system of claim 22, wherein the lithography models use a higher numerical aperture than the fabrication process.

27. The computer system of claim 22, wherein the fabrication process includes using resolution enhancement techniques and the means for simulating a plurality of areas around the sensitive spots does not include using resolution enhancement techniques.

28. The computer system of claim 22, wherein the fabrication process includes using optical proximity correction and the means for simulating a plurality of areas around the sensitive spots does not comprise using optical proximity correction.

29. The computer system of claim 22, further comprising means for defining a key area within a sensitive spot.

30. The computer system of claim 22, further comprising means for scoring the key area.

31. The computer system of claim 30, wherein the scoring the key area comprises:
   means for defining a scoring line within the key area; and
   means for measuring light intensity along the scoring line based on a aerial image simulation.

32. The computer system of claim 30, wherein the scoring the key area comprises means for calculating a line contrast score for a plurality of lines in the key area.

33. The computer system of claim 32, wherein the means for scoring the key are comprises:
   means for defining an offset direction; and
   means for calculating a line contrast score for a plurality of lines of grid points within the key area; where the lines are in the offset direction.

* * * * *